Figure 1:
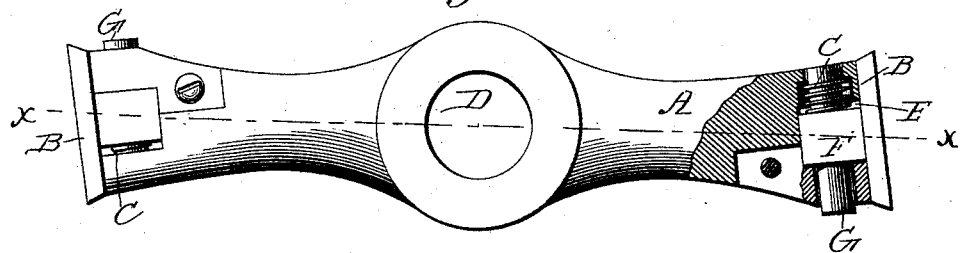
Figure 2:
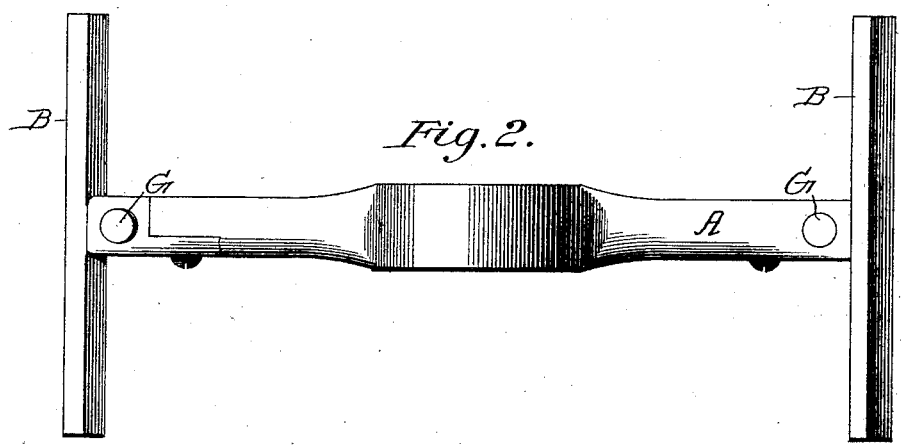

(No Model.)
H. A. MOYER.
SPRING VEHICLE.
No. 357,782. Patented Feb. 15, 1887.
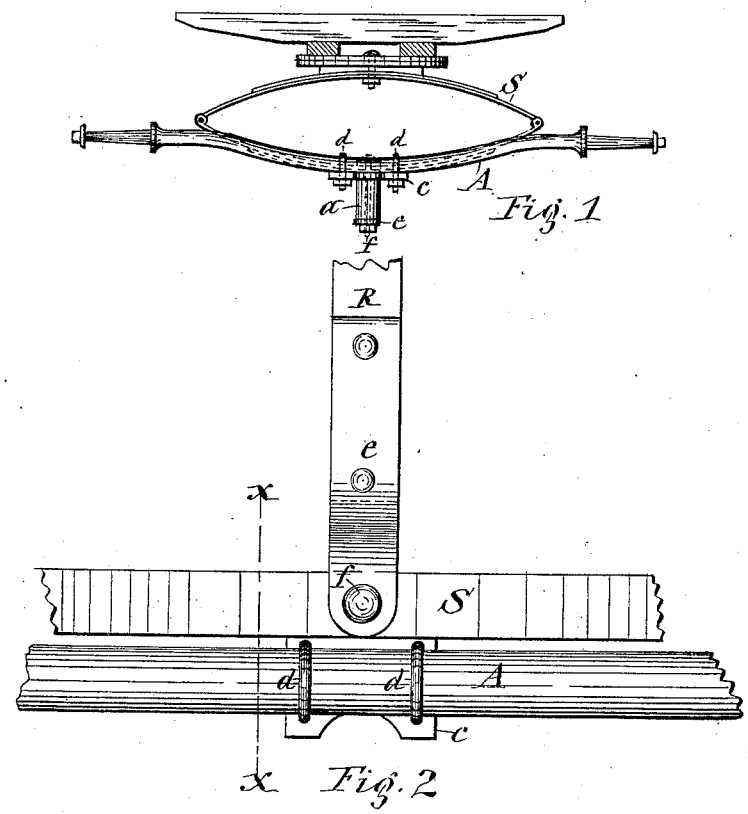
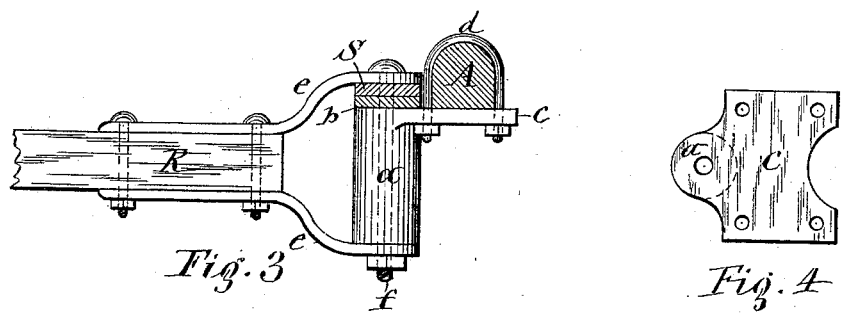
WITNESSES:
INVENTOR
Harvey A. Moyer
BY
ATTORNEYS (No Model.) 2 Sheets—Sheet 1.

T. OLDROYD.
COTTON BEATER.

No. 357,783. Patented Feb. 15, 1887.

Witnesses:
Charles A. Hill
May A. Hill

Thomas Oldroyd Inventor